United States Patent [19]

Taylor, Jr. et al.

[11] Patent Number: 4,771,532
[45] Date of Patent: Sep. 20, 1988

[54] METHOD OF ASSEMBLING A REFRIGERATOR

[75] Inventors: Benson T. Taylor, Jr., Floyd's Knobs, Ind.; Samuel J. Woolley; Kenneth R. Bratcher, both of Louisville, Ky.

[73] Assignee: General Electric Company, Louisville, Ky.

[21] Appl. No.: 148,923

[22] Filed: Jan. 27, 1988

[51] Int. Cl.⁴ .................. B21D 39/00; B23P 19/04
[52] U.S. Cl. .................. 29/455.1; 29/460; 62/441; 220/467; 264/46.5; 264/46.7; 264/338; 312/214; 312/236
[58] Field of Search .......... 62/440, 441, 447; 312/236, 214; 220/435, 467, 469; 29/455 R, 460; 264/46.5, 46.6, 46.7, 338

[56] References Cited

U.S. PATENT DOCUMENTS

| | | |
|---|---|---|
| 2,653,139 | 9/1953 | Sterling .................. 264/46.5 X |
| 3,112,624 | 12/1963 | Rill, Jr. .................. 62/440 |
| 3,152,199 | 10/1964 | Roberts .................. 264/46.5 |
| 3,221,085 | 11/1965 | Rill, Jr. et al. .................. 29/455 X |
| 3,225,564 | 12/1965 | Horvay .................. 62/440 X |
| 3,405,986 | 10/1968 | Cannon .................. 62/440 X |
| 3,440,308 | 4/1969 | Carbary et al. .................. 264/46.5 X |
| 3,948,410 | 4/1976 | Anderson .................. 220/467 |
| 4,050,145 | 9/1977 | Benford .................. 29/460 |
| 4,714,304 | 12/1987 | Sisk et al. .................. 62/441 X |

FOREIGN PATENT DOCUMENTS

207394 1/1960 Fed. Rep. of Germany.

Primary Examiner—William E. Tapolcai
Attorney, Agent, or Firm—Radford M. Reams; Frederick P. Weidner

[57] ABSTRACT

A method of assembling a refrigerator having an outer metal casing, an inner plastic liner and foamed-in-place thermal insulation between the casing and liner bonding them together including a high stress area in the liner that can cause the liner to crack due to a difference in expansion and contraction relative to the outer metal casing. The method comprises forming the metal casing, vacuum forming the liner from plastic material, placing at least one elongated slot open at one end and closed at the opposite end in the liner located in the high stress area, placing the liner inside the casing in spaced relationship thereto, and foaming the space between the casing and liner to bond them together.

13 Claims, 3 Drawing Sheets

METHOD OF ASSEMBLING A REFRIGERATOR

BACKGROUND OF THE INVENTION

This invention relates to refrigerators having a sandwiched cabinet construction of a metal outer casing and a plastic inner liner separated by foamed-in-place insulation bonding the two together.

Refrigerator cabinet constructions having a sandwiched wall structure of a metal outer casing and an inner plastic food liner maintained in a sufficiently structurally rigid relationship by foamed-in-place polyurethane foam insulation along with the attendant advantages and disadvantages of such construction is well known in the refrigerator cabinet making technology. One of the known advantages of a plastic inner liner is its ability to be molded into a configuration providing various support structures including a mullion partition separating the freezer compartment from the fresh food compartment in a refrigerator. However, it is well known that plastic is generally weak in tension and also exhibits a coefficient of expansion many times that of the metal outer casing. Taking these characteristics into consideration, it is realized that securely bonding the plastic inner liner to the metal outer casing through the adhesive qualities of the foamed-in-place insulation would result in the inner liner being subjected to tension forces due to a difference in expansion and contraction of the liner relative to the outer metal casing. The liner would also be subjected to tension forces whenever the inner liner was exposed to temperatures less than the outer wrapper. As this last condition, in fact, describes the general operating condition of a refrigerator, it was found to be necessary to alleviate the transmission of such forces to the inner liner by separating the inner liner from the foamed insulation by a parting agent which would then accommodate the variations in rates of expansion or contraction without developing the tensioning stress. However, use of such a parting agent severely reduces the structural integrity of the complete cabinet structure, or by selectively applying a release agent in those areas of the inner liner facing the foamed insulation that corresponded to structure giving rise to stress concentrations. This latter arrangement, although obviously relieving the inner liner in those high stress areas, in endeavoring to retain the structural integrity of the cabinet would still, under extreme conditions, transmit sufficient tensioning stress to the inner liner to cause it to fracture, especially if the refrigerator is subjected to extremely low temperatures. Such extremely low temperatures may be experienced when the refrigerators are transported through geographical regions where the temperatures may reach $-20$ F. and lower.

SUMMARY OF THE INVENTION

A method of assembling a refrigerator having an outer metal casing, an inner plastic liner and foamed-in-place thermal insulation between the casing and liner bonding them together including a high stress area in the liner that can cause the liner to crack due to variations in rates of expansion and contraction between the outer metal casing and plastic liner. The method comprises forming the metal casing, vacuum forming the liner from plastic material, placing at least one elongated slot open at one end and closed at the opposite end in the liner located in the high stress area, placing the liner inside the casing in spaced relationship thereto and foaming the space between the casing and liner to bond them together. The slot in the high stress area of the liner allows expansion and contraction of the liner in the high stress area thereby eliminating stress cracking in that area.

DESCRIPTION OF THE PREFERRED EMBODIMENT

Figure 1:
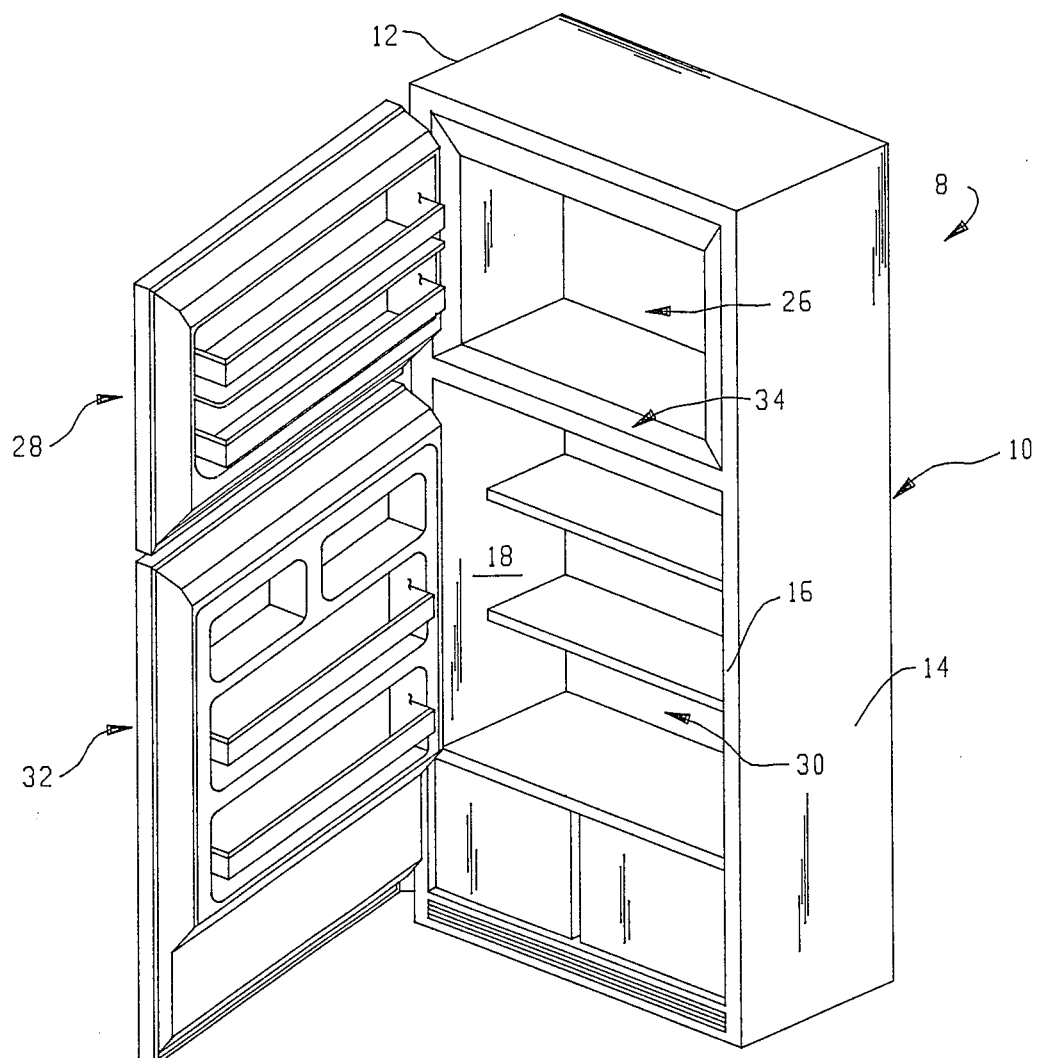
FIG. 1 is a perspective view of a household refrigerator having a freezer compartment at the top and a fresh food compartment at the bottom with the access doors shown in open position.
Figure 4:
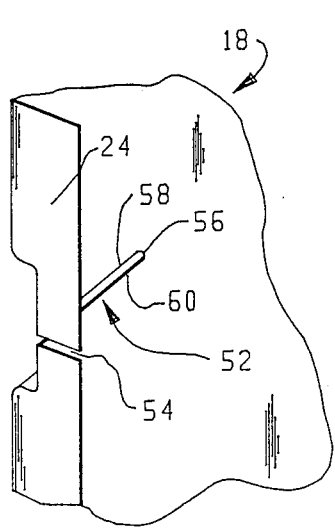
FIG. 4 is a fragmentary view of a portion of the plastic inner liner shown in FIG. 2 and incorporating one form of the present invention.
Figure 2:
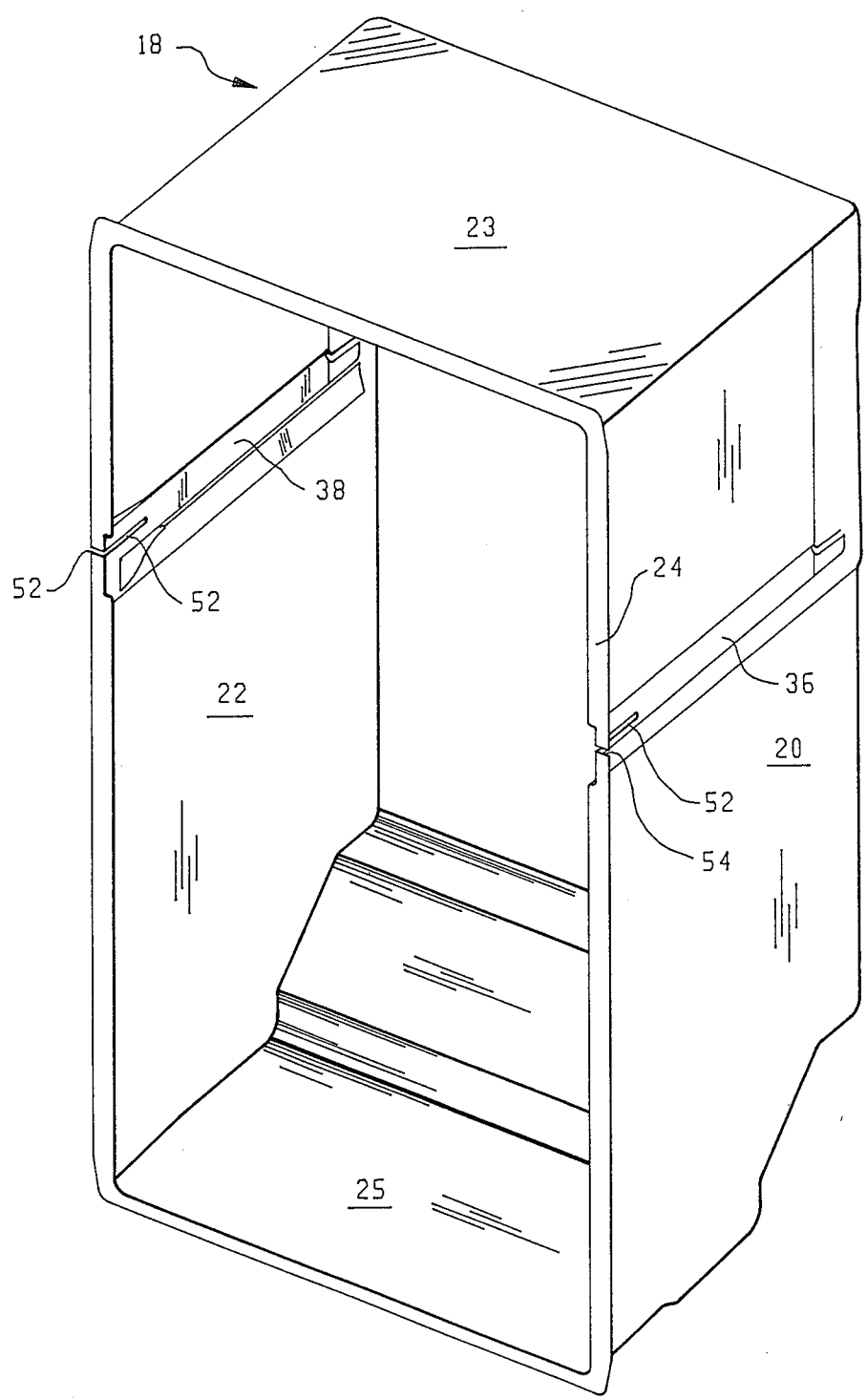
FIG. 2 is a perspective view of the plastic inner liner incorporating the present invention.

With reference to FIGS. 1 and 2, the cabinet of a foamed-in-place refrigerator 8 comprises an outer metal casing 10 generally defining a forwardly open box having side walls 12 and 14 with the forwardly facing opening bounded by a peripheral flange or front face 16, and the internally disposed food compartment liner 18 also generally defining a forwardly open box having side walls 20 and 22, a top wall 23 and a bottom wall 25 with the forwardly facing opening also bounded by a peripheral flange 24 complementary to and cooperating with the front face 16 of the outer metal casing 10. The opposing facing walls of the outer metal casing 10 and liner 18 being in a spaced relationship to define a space therebetween, into which is deposited a foamed-in-place thermal insulation such as polyurethane resin which, when foamed and cured, adhesively bonds the plastic liner 18 to the outer metal casing 10 and forms the thermal insulation of the refrigerator cabinet. In the cabinet construction of the present invention the outer shell 10, as mentioned above, is formed of sheet metal and the liner 18 is molded from a plastic such as acrylonitrile butadiene styrene copolymer (ABS) or the like. Under such conditions, it is to be understood that the coefficient of expansion of the respective materials of the outer metal sheet 10 and plastic liner 18 are sufficiently different (i.e., the coefficient of expansion of the plastic is on the order of 6–7 times that of the metal) that the respective materials expand and contract relative to each other resulting in forces being generated which, as is well known in the art, can cause the plastic inner liner to crack. This occurrence is commonly referred to in the art of making refrigerator cabinets as stress cracking. As a general rule, these critical forces may be developed when the inner liner 18 is subjected to a lower temperature than the outer metal casing 10 whereby it would exhibit a tendency to contract much more so than the outer metal shell 10, with the contraction being resisted by the bonding force of the foamed insulation thereby placing the plastic liner under tensile stress. Stress cracking can also occur as a result of subjecting the refrigerator cabinet to extremely low temperatures as by transporting them through geographical regions where temperatures may reach −20° F. and lower. It is well recognized in the art that plastic is generally weak under tension.

Figure 3:
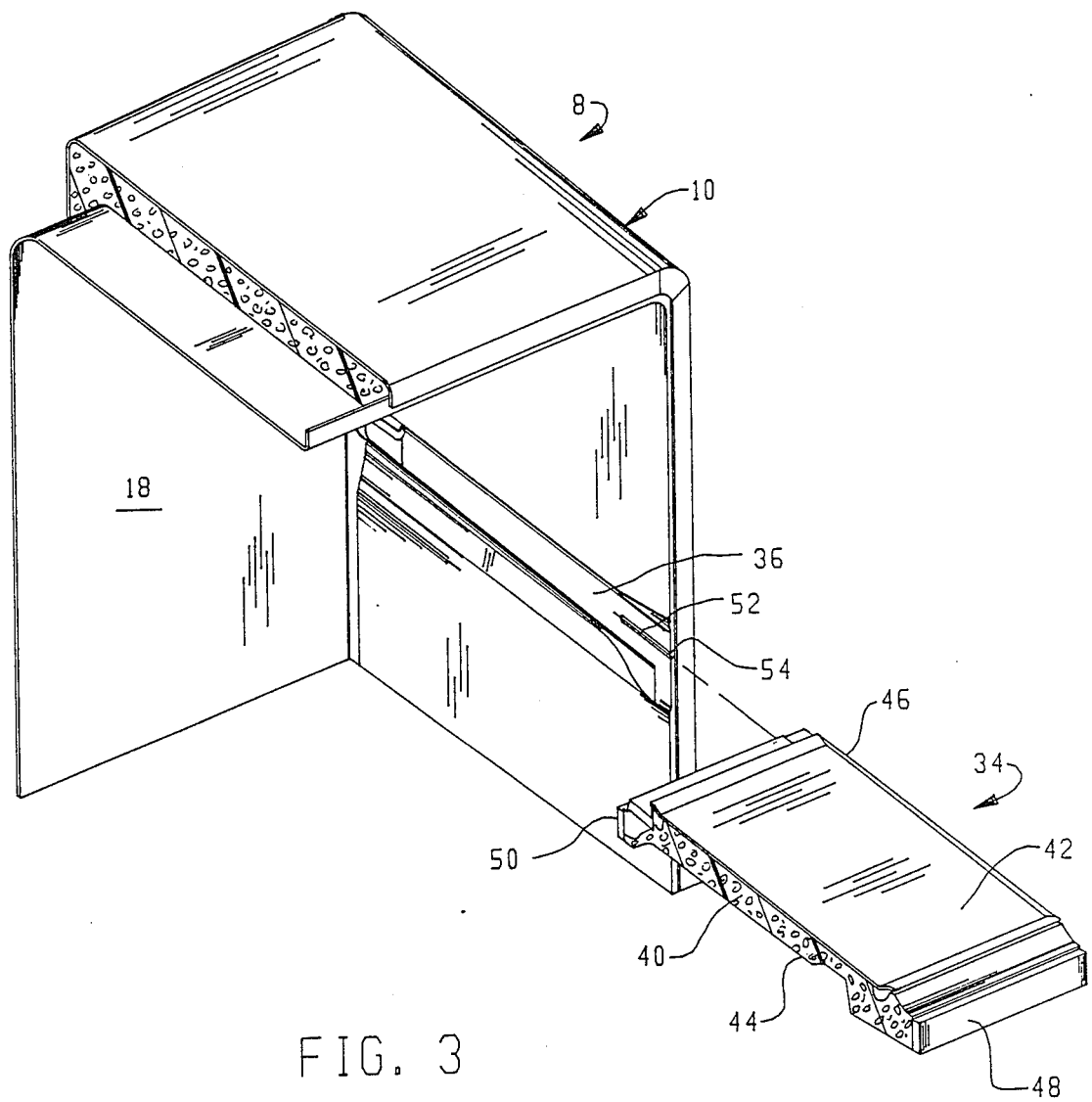
FIG. 3 is a partial exploded perspective view partially in cross-section of a refrigerator incorporating the present invention.

As can be seen in FIG. 1, the refrigerator 8 has a freezer compartment 26 at the top of the refrigerator, which compartment is closed by an access door 28 shown in the open position. Below the freezer compartment 26 is a fresh food compartment 30 with an access door 32 also shown in the open position. Between the freezer compartment 26 and the fresh food compartment 30 is a mullion partition 34 which is used to thermally insulate the below-freezing freezer compartment 26 from the above-freezing temperature fresh food compartment 30. With reference to FIG. 3, the structural arrangement of the refrigerator to incorporate the mullion partition 34 is shown. The liner 18 has formed channels 36 and 38, one in each side of the liner 18 in the mullion area. These channels 36 and 38 are molded in place when the inner liner 18 is vacuum formed from plastic material. These channels are dimensioned to receive the mullion partition 34 separating the freezer compartment 26 from the fresh food compartment 30.

As shown in FIG. 3, the mullion partition 34 includes insulating member 40, top wall 42, bottom wall 44, side walls 46, front wall 48 and rear wall 50. In assembling the mullion partition 34 the insulating member 40 and top wall 42 and bottom wall 44 are sandwiched together as shown in FIG. 3 and inserted into the channels 36 and 38 located in the side walls 20 and 22 of the liner 18. One of the main high stress areas of the plastic liner 18 is the area of the channels 36 and 38 and it is in this area of the liner 18 that prevention of stress cracking is particularly important.

Figure 5:
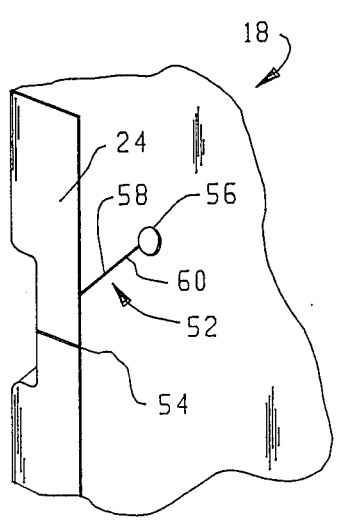
FIG. 5 is a fragmentary view of a portion of the plastic inner liner shown in FIG. 2 incorporating an alternative form of the present invention.
Figure 6:
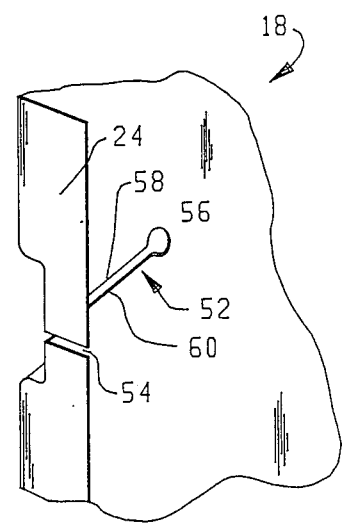
FIG. 6 is a fragmentary view of a portion of the plastic inner liner of FIG. 2 showing yet another alternate form of the present invention.

It has been found that if at least one elongated slot open at one end and closed at the opposite end 52 is placed in the liner located in the high stress area such as in the area of the channels 36 and 38 that the liner is allowed to expand and contract and relieve any stress imparted to the liner that would otherwise cause stress cracking. As can be seen in FIGS. 2-6, the elongated slot 52 is open at one end 54 and the opposite end 56 is closed. In the preferred embodiment the closed end 56 has a radius, although a radius is not necessary to accomplish the desired results. The configuration of slot 52 shown in FIG. 4 has an open end 54 and the opposite end 56 has a radius with a diameter equal to the distance between the sides 58 and 60 of the slot 52. As an example, the slot is about ⅜ inch wide and 3 inches long. As shown in FIG. 5, an alternate form of the slot is a rather narrow slot 52 also having an open end 54 and the radius end 56 having a diameter much greater than the distance between the sides 58 and 60. The slot 52 shown in FIG. 6 is similar to that shown in FIG. 4; however, in this alternate form the radius end 56 has a diameter greater than the distance between the sides 58 and 60.

Figure 7:
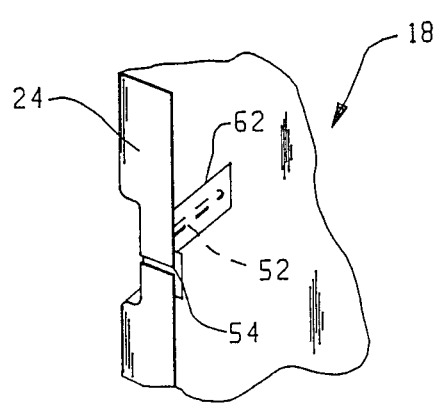
FIG. 7 is a fragmentary view of a portion of the plastic liner similar to FIG. 4 showing a sealing step in the present invention.

In the preferred embodiment of this invention the slot 52 is placed in the liner in the high stress area prior to placing the liner inside the outer metal casing 10. After placing the liner in the outer metal casing, the foaming operation takes place and it is well known in the foaming art that any openings in the liner will have to be plugged or covered, otherwise the foamed insulation will leak through the opening and cause waste of the foam material and also an unsightly appearance on the inside of the liner. To prevent such leakage during the foaming operation the slot 52 should be plugged or covered to seal the slot and prevent the foam from leaking through the liner 18. This may be simply done by placing flexible material such as adhesive tape 62 over the slot (FIG. 7). It will be understood that the tape is flexible so that if there is an subsequent movement of the plastic liner 18 relative to the outer metal casing 10 in the high stress area, the tape will flex and not cause the liner to crack in the area of the slot 52.

In accordance with the method of this invention, a refrigerator is assembled by forming the outer metal casing 10, vacuum forming the liner 18 from plastic material placing at least one elongated slot open at one end and closed at the opposite end in the liner located in a high stress area. The liner is then placed inside the outer metal casing in spaced relationship thereto and polyurethane foam resin is introduced into the space between the outer metal casing 10 and plastic liner 18 to expand and be cured to solidify and bond the outer metal casing and the liner together to form a rigid composite cabinet. It will be understood that the use of an expansion slot in accordance with this invention will not, in most cases, eliminate the need for some release agent being applied to the high stress area of the plastic liner. The application of a release agent and utilization of a slot in the high stress area of the liner can be coordinated to achieve better structural strength of the sandwiched wall structure and reduction of liner stress than if only on of them is utilized. If a release agent is used, it is applied to the liner prior to placing the liner inside the outer metal casing.

After the foaming operation the mullion partition 34 is inserted between the channels 36 and 38 in the side walls of the liner 18 as described previously. With such an arrangement the slot 52 in each channel is covered up by the side walls 46 of the mullion partition and therefore hidden from view upon visual inspection of the interior of the refrigerator.

While the preferred embodiment of the invention is demonstrated by having at least one slot 52 in one of the most troublesome stress cracking areas of a refrigerator liner, namely, in each of the channels 36 and 38, it is to be understood that an expansion slot open at one end and closed at the opposite end may be utilized in any high stress area of the plastic liner where they may be appropriately accommodated to alleviate stress cracking in accordance with this invention. Preferably, any expansion slot formed in a high stress area would be subsequently hidden from view by some structural covering.

While, in accordance with the Patent Statute, there has been described what at present is considered to be the preferred method of the invention, it will be obvious to those skilled in the art that various changes and modifications may be made thereto without departing from the invention. It is, therefore, intended by the appended claims to cover all such changes and modifications as fall within the true spirit and scope of the invention.

What is claimed is:

1. A method of assembling a refrigerator having an outer metal casing, an inner plastic liner and foamed-in-place thermal insulation between the casing and liner bonding them together including a high stress area in the liner that can cause the liner to crack comprising:

forming the metal casing,
vacuum forming the liner from plastic material, forming at least one elongated slot open at one end and closed at the opposite end in the liner located in the high stress area, placing the liner inside the casing in spaced relationship thereto, and foaming the space between the casing and liner to bond them together.

2. The method of assembling a refrigerator according to claim 1 wherein the closed end of the slot has a radius.

3. The method of assembling a refrigerator according to claim 2 wherein the diameter of the radius end is equal to the width of the slot.

4. The method of assembling a refrigerator according to claim 2 wherein the diameter of the radius end is greater than the width of the slot.

5. The method of assembling a refrigerator according to claim 1 wherein after placing at least one slot in the liner and before foaming the space between the casing and liner the slot is sealed with flexible material.

6. The method of assembling a refrigerator according to claim 1 wherein after forming the liner a release agent is applied to . the high stress area in the liner.

7. Method of assembling a refrigerator having a fresh food compartment and a freezer compartment separated by a mullion partition, said refrigerator having an outer metal casing, an inner plastic liner with a back wall and side walls and foamed-in-place thermal insulation between the casing and liner bonding them together including a high stress area in the liner that can cause the liner to crack comprising:

forming the metal casing, vacuum forming the liner from plastic material, said liner having a high stress area in the form of a horizontal channel in each side wall to receive the mullion partition, forming at least one elongated slot open at one end and closed at the opposite end in the liner located in the channel in each side wall, placing the liner inside the casing in spaced relationship thereto, and foaming the space between the casing and liner to bond them together.

8. The method of assembling a refrigerator according to claim 7 wherein there is a single slot at the front of the channels in each side wall.

9. The method of assembling a refrigerator according to claim 7 wherein the closed end of the slot has a radius.

10. The method of assembling a refrigerator according to claim 9 wherein the diameter of the radius end is equal to the width of the slot.

11. The method of assembling a refrigerator according to claim 9 wherein the diameter of the radius end is greater than the width of the slot.

12. The method of assembling a refrigerator according to claim 7 wherein after placing at least one slot in the liner and before foaming the space between the casing and liner the slot is sealed with flexible material.

13. The method of assembling a refrigerator according to claim 7 wherein after forming the liner a release agent is applied to the high stress area in the liner.

* * * * *